United States Patent
Hayashibara (10) Patent No.: US 7,840,113 B2
(45) Date of Patent: Nov. 23, 2010

(54) OPTICAL DISK REPRODUCING APPARATUS

(75) Inventor: Kazuki Hayashibara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1216 days.

(21) Appl. No.: 11/441,058

(22) Filed: May 26, 2006

(65) Prior Publication Data

US 2006/0274613 A1    Dec. 7, 2006

(30) Foreign Application Priority Data

Jun. 6, 2005    (JP) .......................... P2005-165080

(51) Int. Cl.
*H04N 5/91* (2006.01)
(52) U.S. Cl. ........................................ 386/68
(58) Field of Classification Search .................... 386/68
See application file for complete search history.

(56) References Cited

U.S. PATENT DOCUMENTS

| 2006/0031892 A1* | 2/2006 | Cohen | 725/88 |
| 2006/0093320 A1* | 5/2006 | Hallberg et al. | 386/68 |
| 2006/0280086 A1 | 12/2006 | Hayashibara | 369/53.21 |

FOREIGN PATENT DOCUMENTS

| JP | 2001-291377 | 10/2001 |
| JP | A-2002-269754 | 9/2002 |
| JP | A-2004-96401 | 3/2004 |
| JP | 2004-207904 | 7/2004 |
| JP | A-2004-348966 | 9/2004 |
| JP | 2006-338705 | 12/2006 |

* cited by examiner

Primary Examiner—Peter-Anthony Pappas
Assistant Examiner—Asher Khan
(74) Attorney, Agent, or Firm—Morgan, Lewis & Bockius LLP (57) ABSTRACT

An optical disk reproducing apparatus that plays back information recorded on an optical disk, includes: a system controller; and a controller that is operated in accordance with an instruction of the system controller, wherein: when a user operation of skip up/skip down is performed during reproducing of information recorded on the optical disk, the system controller determines whether the skip up/skip down is restricted/permitted; and if it is determined that the skip up/skip down is restricted, the system controller pauses the reproducing and then performs a process with respect to the user operation so as to reproduce designated information.

4 Claims, 5 Drawing Sheets

USER OPERATION CONTROLLED BY User_Operation_Control

| UOP BIT | USER FUNCTION | User_Opeation_Control ||| 
|---|---|---|---|---|
| | | TT_SRPT | PGCI | VOBU |
| UOP0 | Time_Play (), Time_Search () | Yes(*1)(*2) | Yes | No |
| UOP1 | PTT_Play (), PTT_Search () | Yes(*1) | Yes | No |
| UOP2 | Title_Play () | | Yes | No |
| UOP3 | Stop () | | Yes | Yes |
| UOP4 | GoUp () in TT_DOM | | No | Yes |
| | GoUp () in Menu-space | | | |
| | GoUp () in case of Go UP PGCN has (FFFFh) value | | | |
| UOP5 | Time_Search () | | Yes | Yes |
| | PTT_Search () | | | |
| UOP6 | PrevPG_Search () | | Yes | Yes |
| | TopPG_Search () | | | |
| UOP7 | NextPG_Search () | | Yes | Yes |
| UOP8 | Forward_Scan () | | Yes | Yes |
| UOP9 | Backward_Scan () | | Yes | Yes |
| UOP10 | Menu_Call (Title) | | Yes | Yes |
| UOP11 | Menu_Call (Root) | | Yes | Yes |
| UOP12 | Menu_Call (Sub-picture) | | Yes | Yes |
| UOP13 | Menu_Call (Audio) | | Yes | Yes |
| UOP14 | Menu_Call (Angle) | | Yes | Yes |
| UOP15 | Menu_Call (PTT) | | Yes | Yes |
| UOP16 | Resume () | | Yes | Yes |
| UOP17 | Upper_Button_Select () | | Yes | No |
| | Lower_Button_Select () | | | |
| | Left_Button_Select () | | | |
| | Right_Button_Select () | | | |
| | Button_Activate () | | | |
| | Button_Select_and_Activate () | | | |
| UOP18 | Still_Off () | | Yes | Yes |
| UOP19 | Pause_On () | | Yes | Yes |
| – | Pause_Off () | | | |
| – | Menu_Language_Select () | | | |
| UOP20 | Audio_Stream_Change () | | Yes | Yes |
| UOP21 | Sub_picture_Stream_Change () | | Yes | Yes |
| UOP22 | Angle_Change () | | Yes | Yes |
| – | Parental_Level_Select () | | | |
| – | Parental_Country_Select () | | | |
| UOP23 | Karaoke_Audio_Presentation_Mode_Change () | | Yes | Yes |
| UOP24 | Video_Presentation_Mode_Change () | | Yes | Yes |

BLANK COLUMN: NOT APPLICABLE

OPTICAL DISK REPRODUCING APPARATUS

BACKGROUND OF THE INVENTION

1. Field of the Invention

The present invention relates to an optical disk reproducing apparatus that plays back information recorded on an optical disk, and in particular, to a technique of processing a user operation of skip up/skip down with respect to an optical disk, in which user operation control information for controlling whether or not the user operation is practicable is additionally recorded, while the optical disk is played back.

2. Description of the Related Art

In an optical disk for a DVD (digital versatile disk) video that is recently used, a disk manufacturer records, on the disk, information that restricts a user operation (UOP) with respect to functions, such as search, fast forward, or quick return, so as to restrict the user operation.

Figure 5:
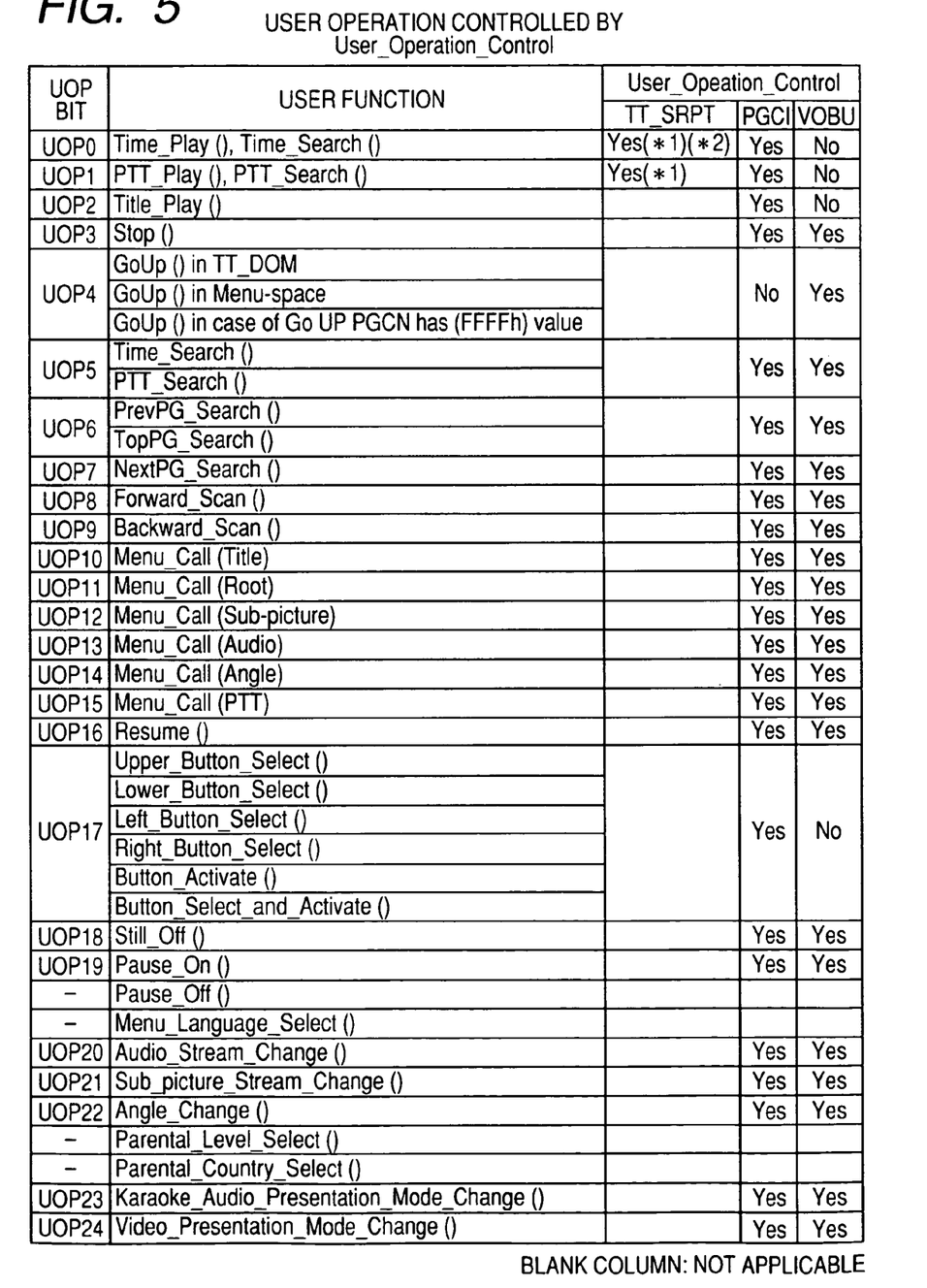
FIG. 5 is a view illustrating user functions, where user operations for realizing the user functions can be controlled by recording restriction information on an optical disk for a DVD video.

FIG. 5 is a view illustrating user functions, where user operations for realizing the user functions can be controlled by recording restriction information on an optical disk for a DVD video. In FIG. 5, Yes indicates that a user operation with respect to a corresponding user function can be controlled by a user operation bit (UOP bit) in corresponding title • search pointer • table (TT_SRPT), program • chain information (PGCI), or video • object • unit (VOBU) and No indicates that the user operation with respect to the corresponding user function cannot be controlled thereby.

In an optical disk reproducing apparatus that plays back the optical disk, the optical disk is played back so as to read out user operation control information indicating a permission or a restriction of the user operation as shown in FIG. 5, that is, user operation control (VOBU_UOP_CTL) information of video • object • unit (VOBU) included in navigation pack (NV_PCK) of control information recorded on the optical disk, and then when a user performs a user operation which is restricted, warning indicating that the user operation is restricted is given on the optical disk by using, for example, mark display and a user function corresponding to the user operation is not performed.

SUMMARY OF THE INVENTION

As describe above, in a conventional optical disk reproducing apparatus, it is determined whether a key input due to a user operation (UOP) is restricted/permitted on the basis of user operation control information recorded beforehand on an optical disk. Accordingly, for example, in the case in which skip up (NextPG_Search( ))/skip down (PrevPG_Search( )) is restricted at a portion that is played back, the skip up/skip down is not performed even though a user tries to perform the skip up/skip down by operating skip up key/skip down key while the optical disk is played back. At this time, for example, a restriction mark is displayed and thus the skip up/skip down processing becomes invalid.

The skip up/skip down processing described above is defined in the DVD specifications. Therefore, the skip up/skip down is not performed because the user operation is not reflected while the optical disk is played back. For this reason, for example, if a manufacturer (editor of recorded information) wants to show a user a commercial advertisement, the optical disk is set such that a portion of the optical disk corresponding to the commercial advertisement is not skipped over. However, the user may not want to see the commercial advertisement.

However, in the conventional optical disk reproducing apparatus, in the case in which the skip up/skip down processing is set to be restricted while the optical disk is played back, the skip up/skip down processing is not performed, which may cause the user to feel inconvenient to use the optical disk reproducing apparatus.

Further, in a conventional technique disclosed in JP-A-2002-269754, information for controlling whether or not a user operation is practicable is read out from a recording medium before starting reproducing of an optical disk, and thus it is possible to see user operations which are not restricted before starting the reproducing of the optical disk. However, even in the conventional technique disclosed in JP-A-2002-269754, in the case in which the skip up/skip down processing is set to be restricted while the optical disk is played back, the skip up/skip down processing is not performed.

Furthermore, in a conventional technique disclosed in JP-A-2004-96401, the validity/invalidity of an operation key during reproducing of an optical disk can be seen beforehand without pressing the operation key. For example, in the case in which a key operation corresponding to a skip up command is made, if it is determined that the skip up is restricted on the basis of reproducing control information (user operation control information), a notice indicating that the skip up is restricted is displayed on a display screen. However, even in the conventional technique disclosed in JP-A-2004-96401, in the case in which the skip up/skip down processing is set to be restricted while the optical disk is played back, the skip up/skip down processing is not performed.

In addition, in a conventional technique disclosed in JP-A-2004-348966, user operation bit group for determining whether or not a user operation is practicable is set on the basis of user operation control information included in reproducing control information, and if the user operation bit group shows that some user operations are restricted, operation keys which are not restricted in the user operation bit group are informed or selectively displayed. However, even in the conventional technique disclosed in JP-A-2004-348966, in the case in which the skip up/skip down processing is set to be restricted while the optical disk is played back, the skip up/skip down processing is not performed.

Accordingly, in order to solve the above-mentioned problems, it is an object of the invention to provide an optical disk reproducing apparatus capable of processing a user operation of skip up/skip down, which is restricted in the DVD specifications, while the optical disk is played back without violating the DVD specifications.

Means for Solving the Problems

According to an aspect of the invention, an optical disk reproducing apparatus that plays back information recorded on an optical disk, including: a system controller including: a user operation recognition unit that, when a user operation is performed during reproducing of information recorded on the optical disk, recognizes the user operation; an operation restriction/permission determination unit that, if the recognized user operation is skip up/skip down, determines whether the skip up/skip down is restricted/permitted on the basis of user operation control information included in navigation pack of control information recorded on the optical disk; a unit detecting the number of key pressing times that, if the recognized user operation is skip up/skip down, detects the number of skip up key pressing times/the number of skip down key pressing times; an argument calculation unit that sets a title number that has been played back immediately before the key pressing as a title number m designated as an argument of PTT_Play (m, n) and calculates a chapter number n designated as an argument of PTT_Play (m, n) on the basis of an equation of n=a+b−c assuming that a chapter number that has been played back immediately before the key pressing is 'a', the number of skip up key pressing times that has been detected is 'b', and the number of skip down key pressing times that has been detected is 'c'; a reproducing pause unit that, if it is determined by the operation restriction/permission determination unit that the skip up/skip down is restricted, pauses the reproducing; and an afterpause reproducing unit that, after the reproducing is paused by the reproducing pause unit, designates both the title number and the chapter number on the basis of the argument and then performs PTT_Play(m, n), which is a process of performing a search, so as to reproduce designated information; and a controller that is operated in accordance with an instruction of the system controller.

In the invention, when the user operation is performed during the reproducing of information recorded on the optical disk, the user operation is recognized by the user operation recognition unit. In addition, if the recognized user operation is skip up/skip down, the determination on whether the skip up/skip down is restricted/permitted is made by the operation restriction/permission determination unit on the basis of the user operation control information included in the navigation pack of the control information recorded on the optical disk.

Further, the number of skip up key pressing times/the number of skip down key pressing times is detected by the unit detecting the number of key pressing times. In addition, the title number that has been played back immediately before the key pressing is set as the title number m designated as the argument of PTT_Play (m, n), and the chapter number n designated as the argument of PTT_Play (m, n) is calculated on the basis of the equation of n=a+b−c assuming that the chapter number that has been played back immediately before the key pressing is 'a', the number of skip up key pressing times that has been detected is 'b', and the number of skip down key pressing times that has been detected is 'c'.

If it is determined that the skip up/skip down is restricted, the reproducing is paused by the reproducing pause unit. After the reproducing is paused, a process based on PTT_Play (m, n) is performed by the afterpause reproducing unit so as to reproduce designated information.

According to the configuration described above, even when a user operation of skip up/skip down restricted in the DVD specifications is performed while an optical disk is played back, the process with respect to the skip up/skip down can be executed without violating the DVD specifications.

According to another aspect of the invention, an optical disk reproducing apparatus that plays back information recorded on an optical disk, including: a system controller; and a controller that is operated in accordance with an instruction of the system controller, wherein: when a user operation of skip up/skip down is performed during reproducing of information recorded on the optical disk, the system controller determines whether the skip up/skip down is restricted/permitted; and if it is determined that the skip up/skip down is restricted, the system controller pauses the reproducing and then performs a process with respect to the user operation so as to reproduce designated information.

In the invention, when the user operation of skip up/skip down is performed during the reproducing of information recorded on the optical disk, it is determined whether the skip up/skip down is restricted/permitted. Then, if it is determined that the skip up/skip down is restricted, the reproducing is paused, and then the process with respect to the user operation is performed so as to reproduce the designated information.

According to the configuration described above, even when a user operation of skip up/skip down restricted in the DVD specifications is performed while an optical disk is played back, the process with respect to the skip up/skip down can be executed without violating the DVD specifications.

In the invention, preferably, the determination on whether the user operation is restricted/permitted is made on the basis of user operation control information included in navigation pack of control information recorded on the optical disk. As such, the determination on whether the user operation is restricted/permitted can be made.

Further, in the invention, preferably, the system controller includes: a user operation recognition unit that, when the user operation is performed during the reproducing of the information recorded on the optical disk, recognizes the user operation; an operation restriction/permission determination unit that, if the recognized user operation is skip up/skip down, determines whether the skip up/skip down is restricted/permitted on the basis of user operation control information included in navigation pack of control information recorded on the optical disk; a unit detecting the number of key pressing times that, if the recognized user operation is skip up/skip down, detects the number of skip up key pressing times/the number of skip down key pressing times; an argument calculation unit that calculates an argument of PTT_Play( ) on the basis of the number of skip up key pressing times/the number of skip down key pressing times; a reproducing pause unit that, if it is determined by the operation restriction/permission determination unit that the skip up/skip down is restricted, pauses the reproducing; and an afterpause reproducing unit that, after the reproducing is paused by the reproducing pause unit, designates both a title number and a chapter number on the basis of the argument and then performs PTT_Play( ), which is a process of performing a search, so as to reproduce designated information.

Accordingly, since the system controller can perform a user operation recognition process, an operation restriction/permission determination process, a process of detecting the number of key pressing times, an argument calculation process, a reproducing pause process, and an afterpause reproducing process, even when a user operation of skip up/skip down restricted in the DVD specifications is performed while an optical disk is played back, the process with respect to the skip up/skip down can be executed without violating the DVD specifications.

Furthermore, in the invention, preferably, the argument calculation unit sets a title number that has been played back immediately before the key pressing as a title number m designated as an argument of PTT_Play (m, n) and calculates a chapter number n designated as an argument of PTT_Play (m, n) on the basis of an equation of n=a+b−c assuming that a chapter number that has been played back immediately before the key pressing is 'a', the number of skip up key pressing times that has been detected is 'b', and the number of skip down key pressing times that has been detected is 'c'. Accordingly, it is possible to set the argument of PTT_Play (m, n) and to designate both the title number and the chapter number so as to perform a search.

As describe above, according to the invention, there is provided the system controller having the user operation recognition unit that, when the user operation is performed during reproducing of information recorded on the optical disk, recognizes the user operation; the operation restriction/permission determination unit that, if the recognized user operation is skip up/skip down, determines whether the skip up/skip down is restricted/permitted on the basis of user operation control information included in navigation pack of control information recorded on the optical disk; the unit detecting the number of key pressing times that, if the recognized user operation is skip up/skip down, detects the number of skip up key pressing times/the number of skip down key pressing times; the argument calculation unit that sets the title number that has been played back immediately before the key pressing as the title number m designated as the argument of PTT_Play (m, n) and calculates the chapter number n designated as the argument of PTT_Play (m, n) on the basis of the equation of n=a+b−c assuming that the chapter number that has been played back immediately before the key pressing is 'a', the number of skip up key pressing times that has been detected is 'b', and the number of skip down key pressing times that has been detected is 'c'; the reproducing pause unit that, if it is determined by the operation restriction/permission determination unit that the skip up/skip down is restricted, pauses the reproducing; and the afterpause reproducing unit that, after the reproducing is paused by the reproducing pause unit, designates both the title number and the chapter number on the basis of the argument and then performs PTT_Play(m, n), which is the process of performing the search, so as to reproduce designated information. As a result, even when the user operation of skip up/skip down restricted in the DVD specifications is performed while an optical disk is played back, the process with respect to the skip up/skip down can be executed without violating the DVD specifications. As a result, it becomes convenient for a user to use the optical disk reproducing apparatus.

Furthermore, according to the invention, there is provided the system controller that determines whether the skip up/skip down is restricted/permitted when the user operation of skip up/skip down is performed during reproducing of information recorded on the optical disk, pauses the reproducing if it is determined that the skip up/skip down is restricted, and then performs a process with respect to the user operation so as to reproduce designated information. As a result, even when the user operation of skip up/skip down restricted in the DVD specifications is performed while an optical disk is played back, the process with respect to the skip up/skip down can be executed without violating the DVD specifications. As a result, it becomes convenient for a user to use the optical disk reproducing apparatus.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

Figure 1:
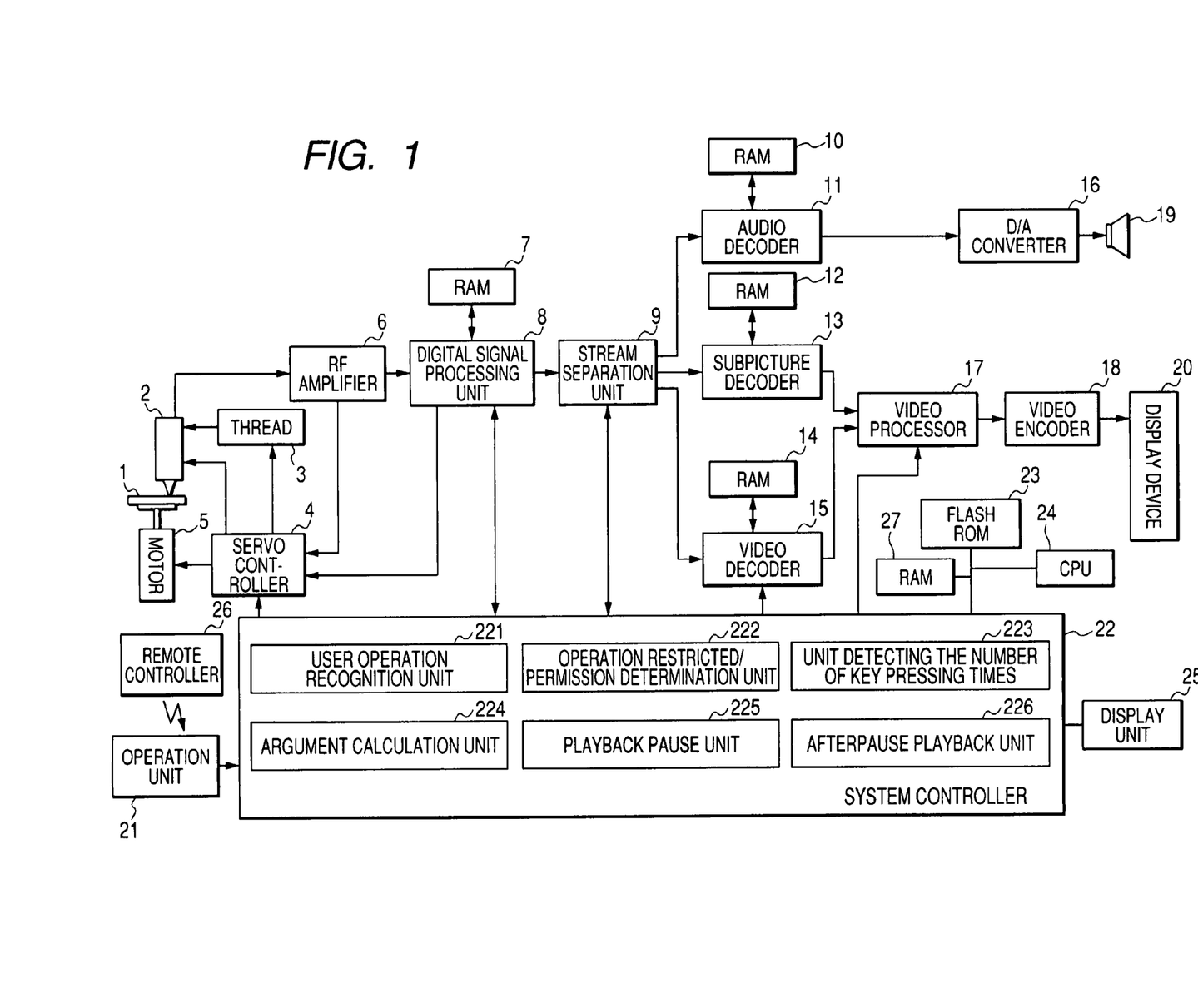
FIG. 1 is a block diagram illustrating the configuration of an optical disk reproducing apparatus according to an embodiment of the invention.

Hereinafter, an embodiment of the invention will be described with reference to the accompanying drawings. FIG. 1 is a block diagram illustrating the configuration of an optical disk reproducing apparatus according to an embodiment of the invention.

The optical disk reproducing apparatus includes a spindle motor 5 that rotates an optical disk (for example, a DVD) 1; an optical pickup 2 that emits a laser beam so as to reproduce information recorded on the optical disk 1 and receives light reflected from the optical disk 1; a thread 3 that moves the optical pickup 2 in the radius direction of the optical disk 1; a system controller 22 that controls the overall system of the optical disk reproducing apparatus; and a servo controller 4 that drives the spindle motor 5 and the thread 3 and moves an object lens (not shown) included in the optical pickup 2 according to an instruction of the system controller 22 and thus performs a control such that the focusing position of the laser beam moves in vertical and horizontal directions with respect to a recording surface of the optical disk 1.

In addition, the optical disk reproducing apparatus further includes an RF amplifier 6 that amplifies an RF signal, which is a signal read from the optical pickup 2, at the time of reproducing of the optical disk 1; a digital signal processing unit 8 that converts the RF signal output from the RF amplifier 6 into digital data, performs a signal demodulation process and an error correction process according to data format of the optical disk 1 for the digital data, and then stores the data in a RAM 7; and a stream separation unit 9 that separates audio data, subpicture data, and picture data from data stream output from the digital signal processing unit 8 according to an instruction of the controller 22.

In addition, the optical disk reproducing apparatus further includes an audio decoder 11 to which audio data output from the stream separation unit 9 is input so as to perform a decoding process; a RAM 10 that temporarily stores data for the decoding process of the audio decoder 11; a subpicture decoder 13 to which the subpicture data output from the stream separation unit 9 is input so as to perform a predetermined decoding process; a RAM 12 that temporarily stores data for the decoding process of the subpicture decoder 13; a video decoder 15 to which the picture data output from the stream separation unit 9 is input so as to perform a predetermined decoding process; and a RAM 14 that temporarily stores data for the decoding process of the video decoder 15.

In addition, the optical disk reproducing apparatus further includes a video processor 17 that synthesizes data output from the video decoder 15 and data output from the subpicture decoder 13 according to the instruction of the system controller 22; a video encoder 18 that converts the synthesized data output from the video processor 17 into video signals for display so as to display the signals on a display device 20; and a D/A converter 16 that converts the data output from the audio decoder 11 into analog audio signals so as to supply the signals to a speaker 19, for example.

In addition, the optical disk reproducing apparatus further includes a remote controller 26 that is composed of a reproducing key (not shown) through which a reproducing instruction is given to the system controller 22, a stop key (not shown) through which an instruction to stop the reproducing is given to the system controller 22, a fast forward key (not shown), a quick return key (not shown), and various operation keys (not shown); an operation unit 21 that has operation keys smaller than the number of operation keys of the remote controller 26 and converts optical signals into electrical signals, by using a light receiving unit (not shown) that receives an optical signal indicating an instruction command from the remote controller 26, so as to input a command signal to the system controller 22.

In addition, the optical disk reproducing apparatus further includes a flash ROM 23 that stores a program or data for controlling each component of the optical disk reproducing apparatus or the entire optical disk reproducing apparatus; a CPU 24 that controls the system controller 22 by performing an operation process according to the program or the data stored in the flash ROM 23; a RAM 27 that temporarily stores data necessary for the operation process of the CPU 24; and a display unit 25 that is provided at the main body side so as to display an operation performed through the operation unit 21 or the remote controller 26.

The system controller 22 is a characteristic component in the present embodiment and includes a user operation recognition unit 221 that, when a user operation is performed during the reproducing of information recorded on the optical disk 1, recognizes the user operation; an operation restriction/permission determination unit 222 that, if the recognized user operation is skip up/skip down, determines whether the skip up/skip down is restricted/permitted on the basis of user operation control information included in the navigation pack of control information recorded on the optical disk 1; a unit 223 detecting the number of key pressing times that, if the recognized user operation is skip up/skip down, detects the number of skip up key pressing times/the number of skip down key pressing times; an argument calculation unit 224 that calculates an argument of PTT_Play( ), which will be described later, on the basis of the number of skip up key pressing times/the number of skip down key pressing times; a reproducing pause unit 225 that, if it is determined by the operation restriction/permission determination unit 222 that the skip up/skip down is restricted, pauses the reproducing; and an afterpause reproducing unit 226 that, after the reproducing is paused by the reproducing pause unit 225, designates both the title number and the chapter number on the basis of the argument and then performs PTT_Play( ), which is a process of performing a search, so as to reproduce the designated information.

Figure 2:
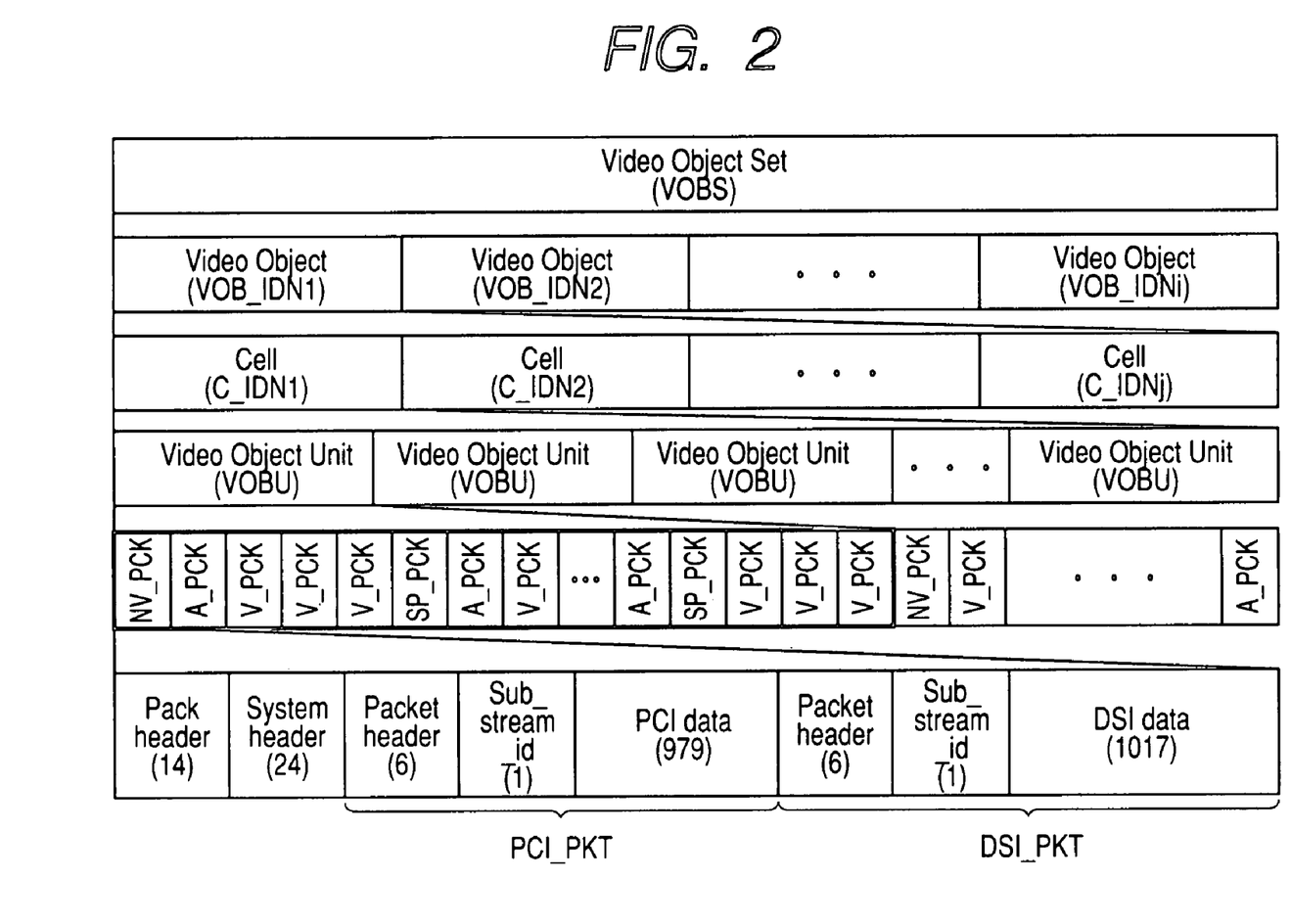
FIG. 2 is a view illustrating the structure of data recorded on an optical disk for a DVD video in the embodiment.

FIG. 2 is a view illustrating the structure of data recorded on an optical disk for a DVD video in the present embodiment. In FIG. 2, video • object • set (VOBS) includes a plurality of video • object (VOB), that is, (VOB_IDN1), (VOB_IDN2), . . . , and (VOB_IDNi). IDN1, IDN2, . . . , and IDNi represents identification numbers. In addition, each video • object (VOB) includes a plurality of Cells. For example, video • object (VOB_IDN1) includes a plurality of cells (C_IDN1), (C_IDN2), . . . , and (C_IDNj). In addition, IDN1, IDN2, and IDNj represent identification numbers.

For example, the Cell (C_IDN1) includes a plurality of video • object • unit (VOBU). Each video • object • unit (VOBU) includes navigation pack (NV_PCK), audio pack (A_PCK), video pack (V_PCK), and subpicture pack (SP_PCK).

The navigation pack (NV_PCK) and the audio pack (A_PCK) are each composed of, for example, 2048 bytes. For example, each of the navigation pack (NV_PCK) and the audio pack (A_PCK) is composed of 14-byte pack header (Pack header), 24-byte system header (System header), 6-byte packet header (Packer header), 1-byte substream identifier (Sub_stream_id), 979-byte play control information data (PCI data), 6-byte packet header (Packet header), 1-byte substream identifier (Sub_stream_id), and 1017-byte data search information data (DSI data).

The 6-byte packet header (Packet header), the 1-byte substream identifier (Sub_stream_id), and the 979-byte play control information data (PCI data) forms play control • packet (PCI_PKT). In addition, the 6-byte packet header (Packet header), the 1-byte substream identifier (Sub_stream_id), and the 1017-byte data search information data (DSI data) forms data search information packet (DSI_PKT).

Figure 3:
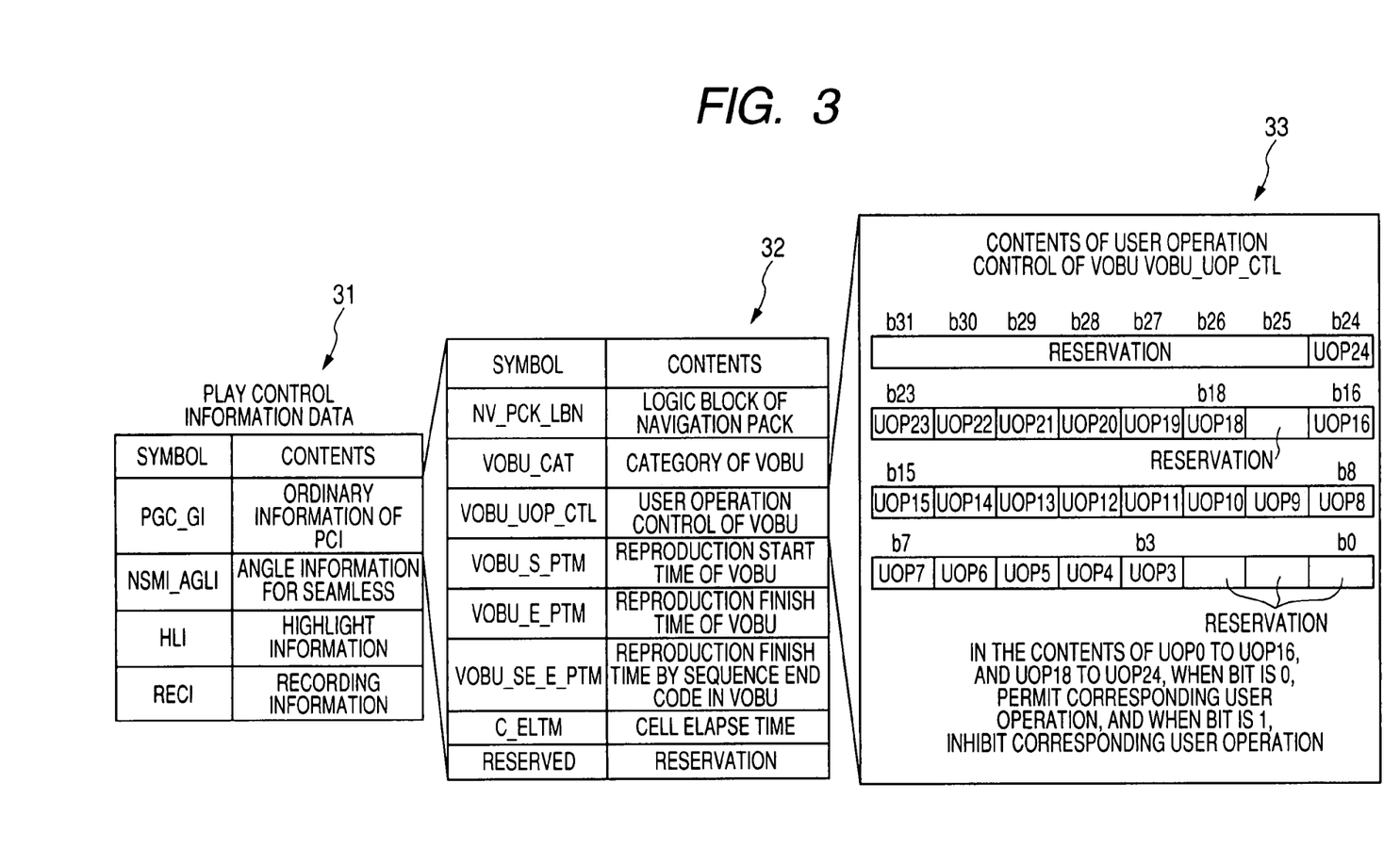
FIG. 3 is a view explaining play control information data (PCI data) in FIG. 2.

FIG. 3 is a view explaining the play control information data (PCI data) in FIG. 2. In FIG. 3, reference numeral 31 represents contents of the play control information data, and reference numeral 32 represents contents of general information of the PCI. In addition, reference numeral 33 represents contents of user operation control (VOBU_UOP-CTL) of VOBU.

The play control information data (PCI data) includes general information of PCI; and non-seamless angle information, highlight information, and recording information. The general information of the PCI includes information on a logic block of the navigation pack, a category of video • object • unit (VOBU), a user operation control of the video • object • unit (VOBU), a reproducing start time of the video • object • unit (VOBU), a reproducing end time due to sequence ending code within the video • object • unit (VOBU), a cell lapse time, and reservation.

User operation control (VOBU_UOP-CTL) information of the video • object • unit (VOBU) can be obtained from the general information of the play control information (PCI) in the navigation pack (NV_PCK) by searching each video title • set (VTS) and then searching last video • object • unit (VOBU) of the video • title • set (VTS) on the basis of forefront video • title • set information (VTSI) by means of title • search • pointer • table (TT_SRPT).

According to the user operation control (VOBU_UOP-CTL) information of the video • object • unit (VOBU), a user operation with respect to a corresponding user function is controlled by user operation bits b3 to b16 and b18 and b24. If each user operation bit is 0, the user operation with respect to the corresponding user function is permitted, and if each user operation bit is 1, the user operation with respect to the corresponding user function is restricted.

Figure 4:
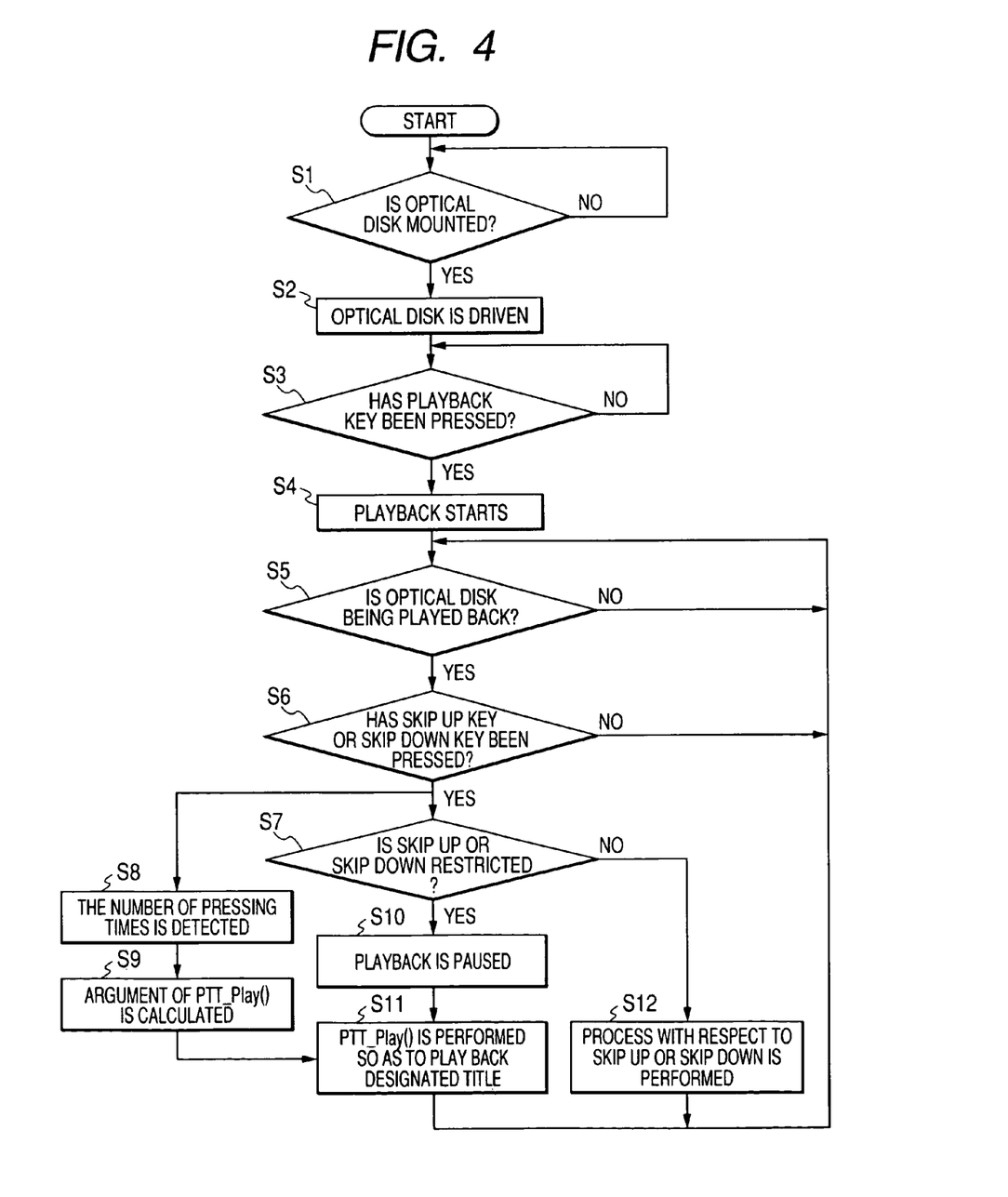
FIG. 4 is a flow chart explaining a process with respect to a user operation of skip up/skip down in the embodiment.

FIG. 4 is a flow chart explaining a process with respect to a user operation of skip up/skip down in the present embodiment. Hereinafter, the process with respect to the user operation of skip up/skip down will be described with reference to the flow chart, FIGS. 1 to 3, and 5.

The optical disk 1 in the present embodiment is a DVD. When the optical disk 1 is mounted, the system controller 22 of the optical disk reproducing apparatus detects that the optical disk 1 has been mounted (step S1), and drives the optical disk 1 (step S2). After the optical disk 1 is driven, for example, when a reproducing key of the remote controller 26 is pressed and the system controller 22 detects that the reproducing key has been pressed (step S3), the system controller 22 rotates the optical disk 1 by rotating the spindle motor 5 through the servo controller 4 and starts the reproducing of information recorded on the optical disk 1 by driving the optical pick-up 2 through the servo controller 4 (step S4).

While the reproducing is performed by the process described above, the system controller 22 determines that the optical disk 1 is played back (step S5). Here, for example, if a skip up key or a skip down key of the remote controller 26 is pressed (step S6), the user operation recognition unit 221 of the system controller 22 recognizes the key pressing as a user operation for performing the skip up or skip down.

The operation restriction/permission determination unit 222 of the system controller 22 checks the user operation control (VOBU_UOP_CTL) information of video • object • unit (VOBU) included in the navigation pack (NV_PCK), and determines whether or not skip up (NextPG_Search( ))/skip down (PrevPG_Search( )) is restricted (step S7).

In addition, the unit 223 detecting the number of key pressing times of the system controller 22 detects the number of skip up key pressing times or the number of skip down key pressing times (step S8). Then, a title number that has been played back immediately before the key pressing is set as a title number m designated as an argument of PTT_Play (m, n), and a chapter number n designated as an argument of PTT_Play (m, n) is calculated on the basis of an equation of n=a+b−c by means of an argument calculation unit, assuming that a chapter number that has been played back immediately before the key pressing is 'a', the number of skip up key pressing times that has been detected is 'b', and the number of skip down key pressing times that has been detected is 'c' (step S9).

If it is determined that the skip up or skip down is not restricted (step S7), a process with respect to the skip up or skip down is performed (step S12). On the other hand, if it is determined that the skip up or skip down is restricted (step S7), the reproducing pause unit 225 pauses the reproducing (step S10). After the reproducing has been paused, the afterpause reproducing unit 226 of the system controller 22 performs a process based on the PTT_Play( ) so as to reproduce the designated title (step S11). In addition, at the time of the pause, a picture which is being played back may be still displayed on a screen.

For example, assuming that the TT (title) number that has been played back immediately before the key pressing is '3', the TT number m designated as an argument becomes '3', and assuming that the CHP (chapter) number a that has been played back immediately before the key pressing is '10', the number b of skip up key pressing times is '2', and the number c of skip down key pressing times is '0', the CHP number n designated as an argument becomes '12' from the equation of n=a+b−c. Accordingly, as PTT_Play(m, n), the PTT_Play( ) becomes PTT_Play(3, 12), which makes a jump over to chapter 12 of title 3 so as to perform reproducing.

Alternatively, assuming that the TT (title) number that has been played back immediately before the key pressing is '2', the TT number m designated as an argument becomes '2', and assuming that the CHP (chapter) number a that has been played back immediately before the key pressing is '10', the number b of skip up key pressing times is '0', and the number c of skip down key pressing times is '3', the CHP number n designated as an argument becomes '7' from the equation of n=a+b−c. Accordingly, as PTT_Play(m, n), the PTT_Play( ) becomes PTT_Play(2, 7), which makes a jump over to chapter 7 of title 2 so as to perform reproducing.

As described above, according to the present embodiment, even when a user operation of skip up/skip down restricted in the DVD specifications is performed while an optical disk is played back, the process with respect to the skip up/skip down can be executed without violating the DVD specifications. As a result, it becomes convenient for a user to use an optical disk reproducing apparatus.

What is claimed is:

1. An optical disk reproducing apparatus that plays back information recorded on an optical disk, comprising:
  a system controller including:
  a user operation recognition unit that, when a user operation is performed during reproducing of information recorded on the optical disk, recognizes the user operation;
  an operation restriction/permission determination unit that, if the recognized user operation is skip up/skip down, determines whether the skip up/skip down is restricted/permitted on the basis of user operation control information included in navigation pack of control information recorded on the optical disk;
  a unit detecting the number of key pressing times that, if the recognized user operation is skip up/skip down, detects the number of skip up key pressing times/the number of skip down key pressing times;
  an argument calculation unit that sets a title number that has been played back immediately before the key pressing as a title number m designated as an argument of PTT_Play (m, n) and calculates a chapter number n designated as an argument of PTT_Play (m, n) on the basis of an equation of n=a+b−c assuming that a chapter number that has been played back immediately before the key pressing is 'a', the number of skip up key pressing times that has been detected is 'b', and the number of skip down key pressing times that has been detected is 'c';
  a reproducing pause unit that, if it is determined by the operation restriction/permission determination unit that the skip up/skip down is restricted, pauses the reproducing; and
  an afterpause reproducing unit that, after the reproducing is paused by the reproducing pause unit, designates both the title number and the chapter number on the basis of the argument and then performs PTT_Play(m, n), which is a process of performing a search, so as to reproduce designated information; and
  a controller that is operated in accordance with an instruction of the system controller.

2. An optical disk reproducing apparatus that plays back information recorded on an optical disk, comprising:
  a system controller; and
  a controller that is operated in accordance with an instruction of the system controller, wherein:
  when a user operation of skip up/skip down is performed during reproducing of information recorded on the optical disk, the system controller determines whether 5 the skip up/skip down is restricted/permitted; and
  if it is determined that the skip up/skip down is restricted, the system controller pauses the reproducing and then performs a process with respect to the user operation so as to reproduce designated information;
  wherein the system controller includes:
  a user operation recognition unit that, when the user operation is performed during the reproducing of the information recorded on the optical disk, recognizes the user operation;
  an operation restriction/permission determination unit that, if the recognized user operation is skip up/skip down, determines whether the skip up/skip down is restricted/permitted on the basis of user operation control information included in navigation pack of control information recorded on the optical disk;
  a unit detecting the number of key pressing times that, if the recognized user operation is skip up/skip down, detects the number of skip up key pressing times/the number of skip down key pressing times;
  an argument calculation unit that calculates an argument of PTT_Play( ) on the basis of the number of skip up key pressing times/the number of skip down key pressing times;
  a reproducing pause unit that, if it is determined by the operation restriction/permission determination unit that the skip up/skip down is restricted, pauses the reproducing; and
  an afterpause reproducing unit that, after the reproducing is paused by the reproducing pause unit, designates both a title number and a chapter number on the basis of the argument and then performs PTT_Play( ), which is a process of performing a search, so as to reproduce designated information.

3. The optical disk reproducing apparatus according to claim 2, wherein
the determination on whether the user operation is restricted/permitted is made on the basis of user operation control information included in navigation pack of control information recorded on the optical disk.

4. The optical disk reproducing apparatus according to claim 2, wherein
the argument calculation unit sets a title number that has been played back immediately before the key pressing as a title number m designated as an argument of PTT_Play (m, n) and calculates a chapter number n designated as an argument of PTT_Play (m, n) on the basis of an equation of n=a+b−c assuming that a chapter number that has been played back immediately before the key pressing is 'a', the number of skip up key pressing times that has been detected is 'b', and the number of skip down key pressing times that has been detected is 'c'.

* * * * *